United States Patent
Zeng et al.

(10) Patent No.: US 11,454,266 B2
(45) Date of Patent: Sep. 27, 2022

(54) CABLE CLAMP

(71) Applicant: LEDVANCE GmbH, Garching bei Munich (DE)

(72) Inventors: Tianci Zeng, Shenzhen (CN); Daogang Wei, Shenzhen (CN)

(73) Assignee: LEDVANCE GMBH, Garching bei Munich (DE)

( * ) Notice: Subject to any disclaimer, the term of this patent is extended or adjusted under 35 U.S.C. 154(b) by 151 days.

(21) Appl. No.: 16/811,404

(22) Filed: Mar. 6, 2020

(65) Prior Publication Data

US 2020/0284284 A1 Sep. 10, 2020

(30) Foreign Application Priority Data

Mar. 6, 2019 (CN) .................. 201920280603.X

(51) Int. Cl.
| | |
|---|---|
| *F16B 7/00* | (2006.01) |
| *F16B 7/04* | (2006.01) |
| *F21V 17/16* | (2006.01) |
| *F16G 11/00* | (2006.01) |
| *H02G 15/00* | (2006.01) |
| *H02G 15/007* | (2006.01) |
| *F21Y 115/10* | (2016.01) |
| *F21V 23/00* | (2015.01) |

(52) U.S. Cl.
CPC ............ *F16B 7/0406* (2013.01); *F16G 11/00* (2013.01); *F21V 17/164* (2013.01); *H02G 15/00* (2013.01); *H02G 15/007* (2013.01); *F21V 23/001* (2013.01); *F21V 23/003* (2013.01); *F21Y 2115/10* (2016.08)

(58) Field of Classification Search
CPC .... H02G 15/00; H02G 15/007; F16B 7/0406; F16B 2/20; F16B 2/246
See application file for complete search history.

(56) References Cited

U.S. PATENT DOCUMENTS

| | | | | |
|---|---|---|---|---|
| 3,622,943 | A * | 11/1971 | Reimer | H01R 13/5804 439/472 |
| 4,183,120 | A * | 1/1980 | Thorne | B25B 25/005 24/16 R |
| 5,725,185 | A * | 3/1998 | Auclair | F16L 3/12 248/73 |
| 6,632,994 | B1 * | 10/2003 | Mangone, Jr. | H02G 3/0487 174/72 A |
| 9,360,648 | B2 * | 6/2016 | Rudenick | G02B 6/46 |
| 2011/0315830 | A1 * | 12/2011 | Eshima | H02G 3/32 248/74.1 |
| 2013/0093143 | A1 * | 4/2013 | Aldrich | H01R 13/58 279/60 |
| 2016/0003377 | A1 * | 1/2016 | Denner | B60R 16/0215 248/74.1 |
| 2016/0301156 | A1 * | 10/2016 | Aldrich | H01R 13/58 |

(Continued)

*Primary Examiner* — Gerald J Sufleta, II
(74) *Attorney, Agent, or Firm* — Hayes Soloway PC

(57) ABSTRACT

A cable clamp for holding a cable, preferably for an LED driver, including a clamp cover and a clamp gear which can be joined together, thereby defining an inner space for accommodating a portion of the cable, and a bracket placed inside the inner space and configured to apply a clamping force on the cable, wherein the bracket is adjustable in a direction perpendicular to the axial direction of the cable such that the bracket can take different positions in the joined state.

20 Claims, 5 Drawing Sheets

(56) References Cited

U.S. PATENT DOCUMENTS

| | | | |
|---|---|---|---|
| 2017/0077688 A1* | 3/2017 | Metzler | H01R 13/424 |
| 2017/0122364 A1* | 5/2017 | Graham | F16C 1/223 |
| 2017/0141512 A1* | 5/2017 | Drescher | H02G 3/0625 |
| 2018/0216753 A1* | 8/2018 | Hughes | F16L 3/23 |
| 2021/0210938 A1* | 7/2021 | Guo | F16L 3/22 |

\* cited by examiner

CABLE CLAMP

CROSS-REFERENCE TO RELATED APPLICATIONS

This application claims the benefit of Chinese patent application No. 201920280603X filed Mar. 6, 2019, which is hereby incorporated by reference herein in its entirety.

TECHNICAL FIELD

The present invention relates to a cable clamp for holding or securing a cable. Preferably the cable clamp is used for or part of an LED driver.

BACKGROUND

With the advent of LED lamps, efficient and long-lived lighting means are available. In comparison to other conventional lighting devices, such as fluorescent lamps, materials of LED lamps are safer since, for example, no mercury is required, and LED lamps have a longer service life and higher energy efficiency.

LED lamps usually utilize an LED driver configured to convert the voltage and/or current provided by a power supply to the voltage and/or current requirements of the LEDs. Some of the LED lamps or luminaires, such as downlights and panel lights, utilize an external LED driver which is connected to the LED lamp(s) via a cable. Compared to integrated LED drivers, the external LED driver can be easily installed and replaced.

A cable clamp as part of the LED driver, for instance integrated in or attached to a housing of the LED driver, is used to securely hold the cable and provide strain relief. It is desirable that the cable clamp is easy to install, safe and reliable.

Different configurations and technical solutions for cable clamps are available, one of which uses screws to lock a clamp cover and a clamp gear in order to fix the cable in between. The installation process requires a number of comparatively time-consuming steps, including tightening the screws. Cable clamps which utilize clips are usually restricted with regard to the achievable pressing force and are designed for cables of certain diameters. Moreover, the reliability of cable clamps tends to deteriorate over time and use.

SUMMARY OF THE INVENTION

The device disclosed herein is an improved cable clamp, particularly in view of reliability and flexibility.

In some embodiments the cable clamp is configured to hold or secure a cable which may serve to connect an LED driver with a power supply or one or more LED lamps or luminaires. Preferably the cable clamp is used for or is part of an LED driver.

In some embodiments the cable clamp according to the invention comprises a clamp cover and a clamp gear which can be joined together, thereby defining an inner space for accommodating a portion, preferably an end portion, of the cable. The cable clamp further comprises a bracket placed inside the inner space and configured to assert a clamping force on the cable. The bracket is adjustable in a direction perpendicular to the axial direction of the cable such that it can take different positions in the joined state.

In some embodiments, the bracket can be adjusted so that the adjustment path has a non-zero vector component towards or away from the cable. The possible positions which can be achieved via adjustment refer to the clamped state, i.e. the process of opening or joining the clamp cover and the clamp gear is not a realization of the adjustability as defined above.

Herein, the terms "vertical", "perpendicular", "horizontal" etc. refer to the axial direction of the cable correctly inserted to and secured by the cable clamp.

The cable clamp according to the invention allows for quick and easy installation of the cable. The cable is reliably fixed, because the holding or clamping force can be adjusted by the bracket. This implies that any degradation of the clamping force can be compensated. The cable clamp is adjustable for different sizes and diameters of the cable, thereby improving the flexibility thereof. These effects are achieved with a simple and reliable structure, which also provides a good appearance.

In one embodiment, the clamp cover and/or the clamp gear is displaceable, or pivotable, relative to each other, in order to open the inner space such that the cable can be inserted and then closed wherein the cable clamp is in the joined position for holding the cable, wherein closing the cable clamp pushes the bracket towards the cable, thereby applying the clamping force on the cable. Thus, the processes of clamping and releasing the cable can be performed particularly easy and quick, without impairing the reliability of the clamped state.

In one embodiment, the cable clamp further comprises a connecting means, such as a clip, for locking the clamp cover and the clamp gear in the joined position. This helps secure the clamped state without utilizing separate means such as a screw.

In another embodiment, the clip comprises one or more clip openings, for instance provided in a front side of the clamp cover, and corresponding clip noses, for instance provided at a front side of the clamp gear, which are configured to snap into each other in the joined position, thereby implementing a structurally simple and reliable clip.

In an embodiment, the clamp cover or the clamp gear comprises one or more, for instance two, guiding portions configured to guide the bracket such that the bracket can be moved along a defined, preferably linear, trajectory. The guiding portions are preferably placed and fixed inside the clamp cover. The guiding portions and the clamp cover may be realized as separate components but may as well be integrally formed. The guiding portions define the degree(s) of freedom along which the bracket can be adjusted, thereby simplifying the use and improving the reliability of the cable clamp.

In an embodiment, the bracket comprises a gear shaft, and the guiding portions each comprise a longitudinal guiding opening configured to receive the gear shaft, thereby implementing simple and reliable guiding portions.

In one embodiment, the guiding openings are at least partially inclined relative to the axial direction of the cable, allowing adjustment of the vertical distance of the bracket relative to the cable. Thus, the cable clamp can be easily adjusted for differently shaped and/or sized cables.

In one embodiment, each guiding opening comprises two longitudinal sides and at least one of the longitudinal sides of at least one guiding portion comprises a plurality of stopping recesses which are configured to define discrete positions for positioning and/or locking the bracket. Thus, the desired adjusted position of the bracket can be easily selected and secured.

For the same purpose, the gear shaft may comprise a protrusion which is shaped such as to fit into the stopping recesses.

In another embodiment, the guiding portions and the bracket are configured such that rotating the bracket around the gear shaft locks and unlocks the bracket at a longitudinal position within the guiding openings. For instance, rotation of the bracket such that the protrusion of the gear shaft snaps into corresponding stopping recesses provides an easy and reliable implementation of securely locking the bracket. Unlocking may be achieved by rotating the bracket in the opposite direction such that the protrusion leaves the corresponding stopping recesses.

The locked position may be further secured by one or more concave portions which are configured to snap into the guiding openings.

In one embodiment, the bracket comprises one or more lugs configured to stabilize the bracket such as to avoid deformation thereof due to the clamping force towards the cable.

In one embodiment the bracket and/or the clamp gear comprise a plurality of ribs configured to grip and hold the cable. In other words, the ribs are configured to directly contact the cable in the clamped state. The ribs may have a concave shape which forms a receptacle for the cable. The bracket and/or the clamp gear may have alternative gripping surfaces. The gripping surfaces may be optimized for securely holding the cable, i.e. the gripping surfaces may comprise protrusions, recesses, a suitable coating, etc. Alternatively, or additionally, the gripping surfaces may be made of a material which is suitable to securely hold the cable.

BRIEF DESCRIPTION OF THE DRAWINGS

Preferred embodiments of the invention will be explained in the following, having regard to the drawings.

DETAILED DESCRIPTION OF THE INVENTION

Figure 1:
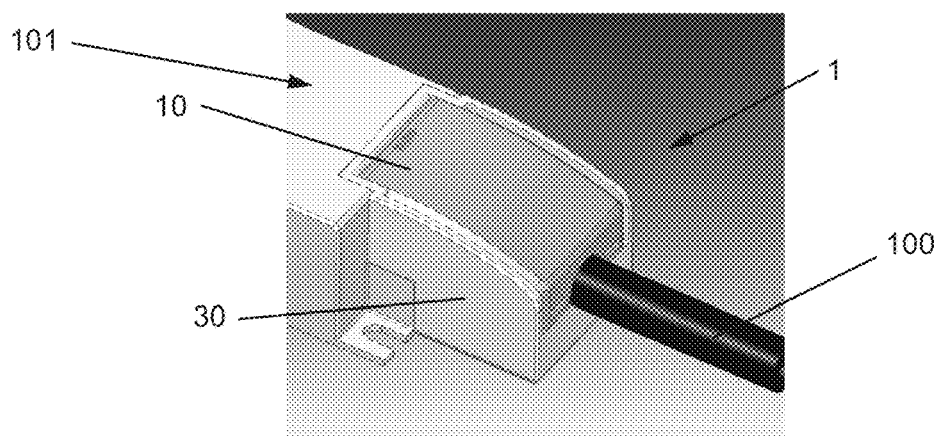
FIG. 1 is a perspective view of a cable clamp illustrating the outer appearance thereof.

In the following, preferred embodiments of the invention will be described with reference to the drawings. The same or similar elements or elements having the same effect are indicated by the same reference number in the drawings. Repeating the description of such elements may be omitted in order to prevent redundant descriptions.

FIG. 1 is a perspective view of a cable clamp 1 illustrating the outer appearance thereof.

The clamp 1 comprises a clamp cover 10 and a body denoted as clamp gear 30. The cable clamp 1 is configured to fix and securely hold a cable 100. The cable clamp 1 is preferably part of an LED driver 101. In this case the cable 100 may serve to connect the LED driver 101 with a power supply and/or one or more LED lamps or luminaires.

Figure 2A:
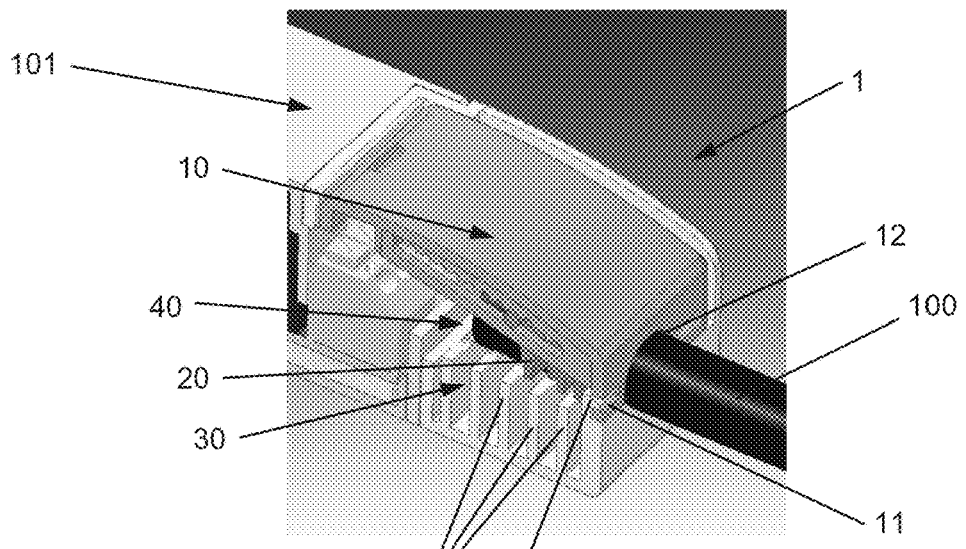
FIG. 2a is a perspective view of the cable clamp illustrating the inner configuration thereof.
Figure 2B:
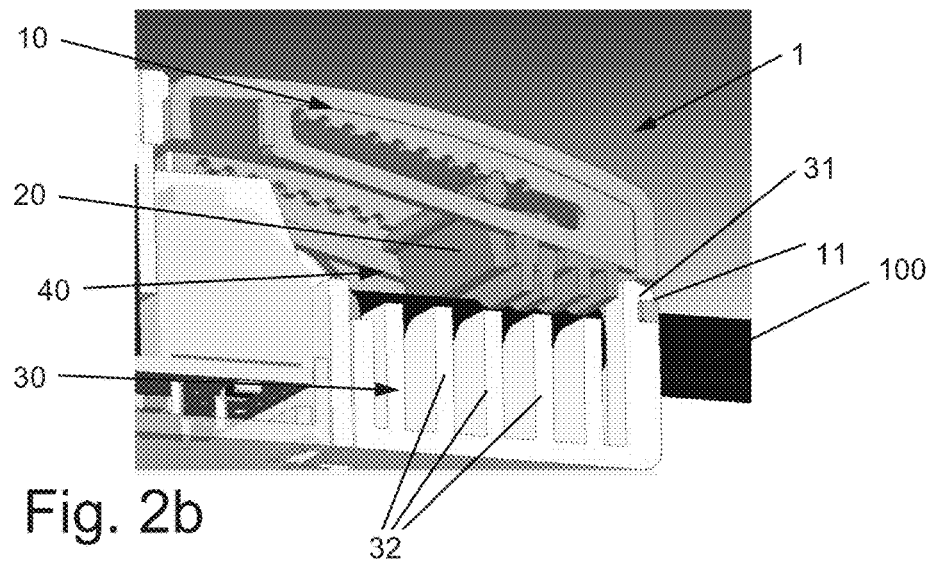
FIG. 2b is a perspective view of the cable clamp illustrating the inner configuration thereof.

FIGS. 2a and 2b are perspective views of the cable clamp 1 illustrating the inner configuration thereof.

At one end, hereinafter referred to as the "front side", the clamp cover 10 and/or the clamp gear 30 form a substantially circular cable hole 12 which is configured to receive the cable 100. An end portion of the cable 100 is inserted into an inner space 40 of the cable clamp 1 and tightly placed between the clamp gear 30 and a bracket 20 which is mounted at the clamp cover 10 such that it can be adjusted as detailed further below.

In the closed or joined state illustrated in FIGS. 1, 2a and 2b, the clamp cover 10 and the clamp gear 30 form a housing surrounding the clamped end portion of the cable 100.

The clamp cover 10 is pivotably mounted at the end which in the axial direction of the cable 100 is located opposite to the cable hole 12 such that the clamp cover 10 can be opened and closed. In the opened state, the cable 100 can be easily inserted. Closing the cable clamp 1 pushes the bracket 20 towards the cable 100 thereby applying a clamping force on the cable.

For securely fixing the closed state, the cable clamp 1 comprises a clip 11, 31. According to the present embodiment, the clip 11, 31 is formed of a pair of clip openings 11 provided in the front side of the clamp cover 10 and corresponding clip noses 31 provided at the front side of the clamp gear 30. The clip openings 11 and the clip noses 31 are configured to snap into each other if the clamp cover 10 is pivoted and pushed towards the clamp gear 30. Once the clamp cover 10 is closed, the cable 100 is tightly fixed between the clamp gear 30 and the bracket 20 as best illustrated in FIGS. 2a, 2b and 6a, 6b.

Figure 3:
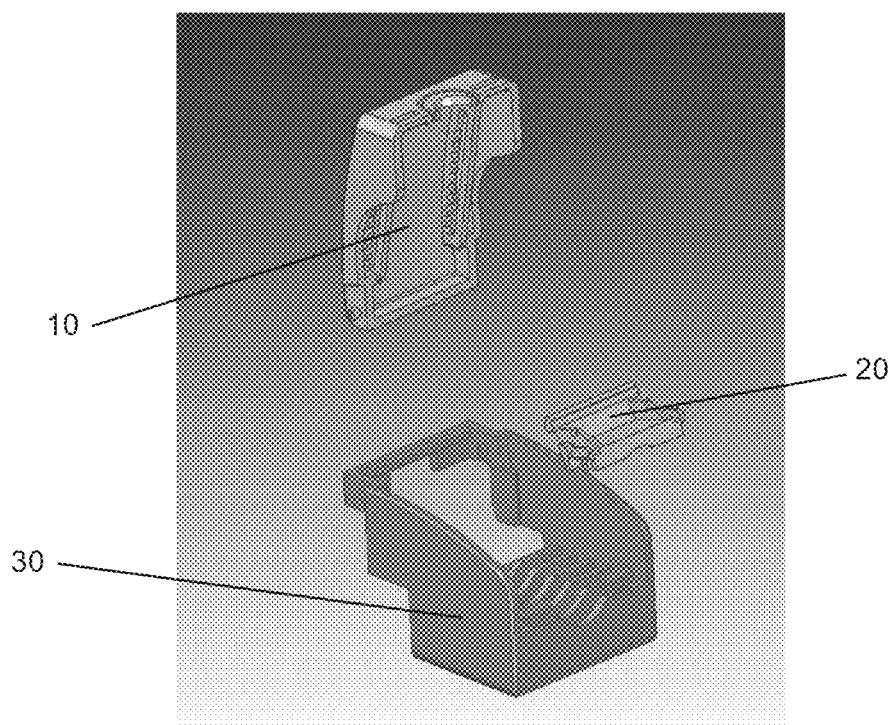
FIG. 3 is an exploded perspective view of the cable clamp, which separately illustrates the clamp cover, the bracket and the clamp gear.

FIG. 3 is an exploded perspective view separately illustrating the clamp cover 10, the bracket 20, and the clamp gear 30.

Figure 4A:
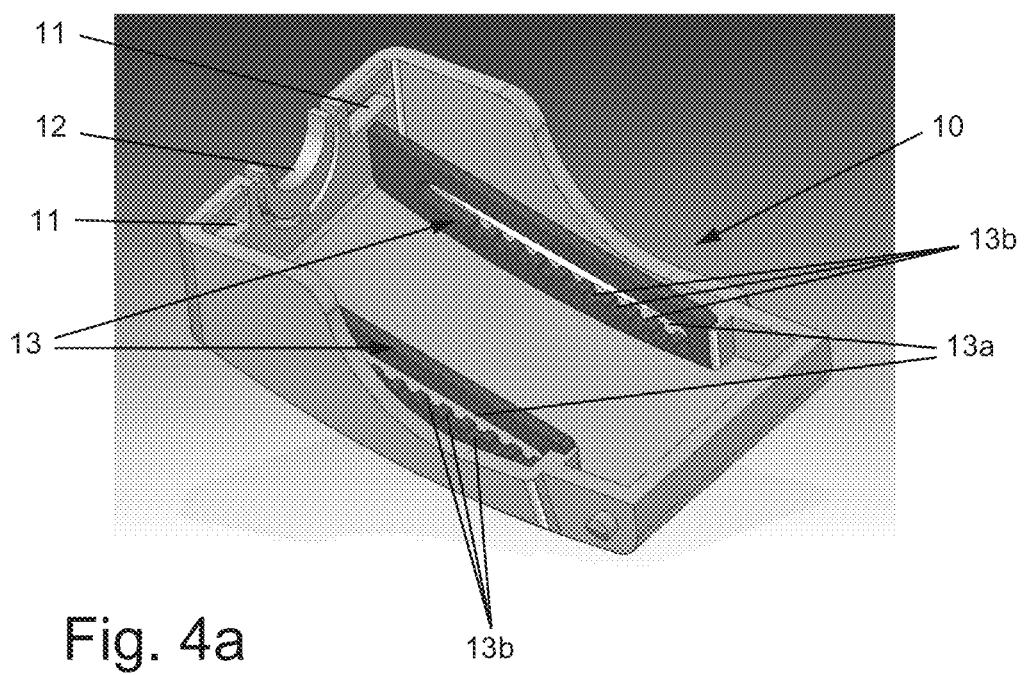
FIG. 4a is a perspective view of the clamp cover.
Figure 4B:
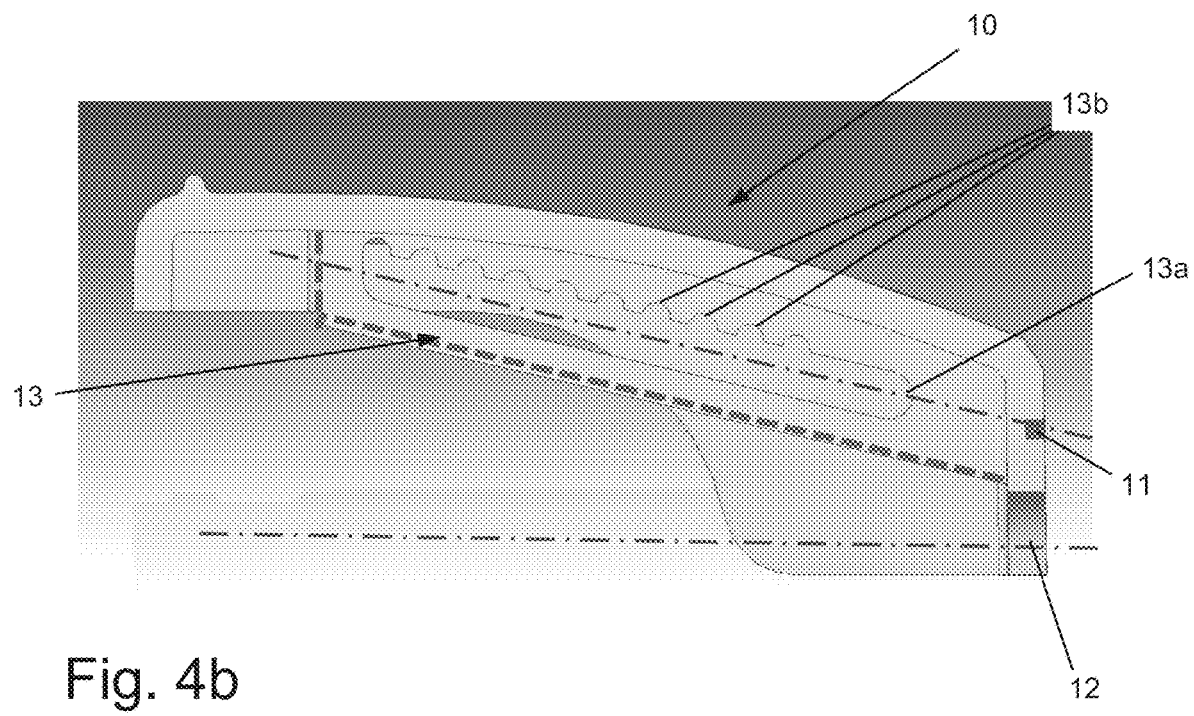
FIG. 4b is a perspective view of the clamp cover.

Starting with the clamp cover 10, reference is particularly made to the FIGS. 4a and 4b. The clamp cover 10 has a partially hollow, concave shape such that it forms part of the cable clamp housing. The clamp cover 10 comprises two parallel guiding portions 13 placed and fixed inside the clamp cover 10. Please note that the guiding portions 13 and the clamp cover may be realized by separate components as illustrated in FIG. 4a but may as well be integrally formed.

The guiding portions 13 are configured to hold and guide the bracket 20. For this purpose, each guiding portion 13 has a guiding opening 13a extending in a longitudinal direction. Thus, each guiding opening 13a has two longitudinal sides. At least one of the longitudinal sides of each guiding portion 13 comprises a plurality or one-dimensional array of stopping recesses 13b which are configured to define discrete positions for locking the bracket 20 as described in more detail with regard to FIGS. 5b and 5c.

The longitudinal direction of the guiding openings 13a and the axial direction of the cable 100 may be almost but not exactly parallel as best illustrated in FIG. 4b. Even though according to the illustrated embodiment the guiding openings 13a extend substantially linear, the guiding openings 13a may as well be curved. The term "longitudinal direction" should therefore not be interpreted to cover only linear extensions.

Figure 5A:
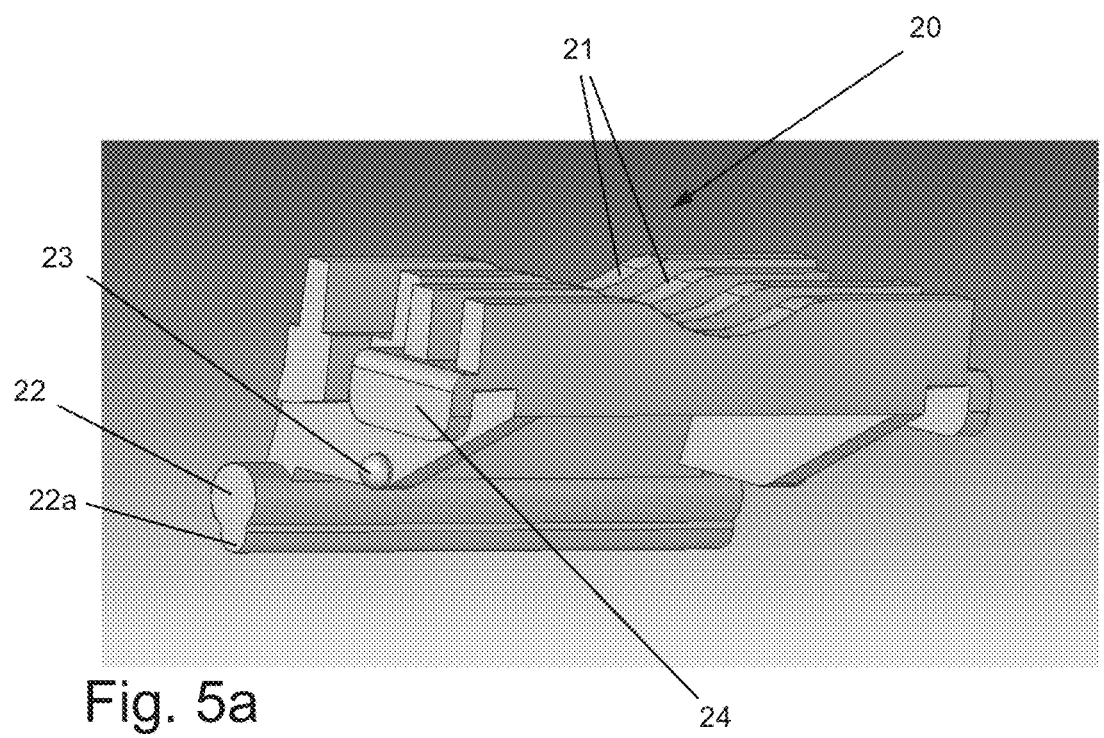
FIG. 5a is a perspective view of the bracket.

FIG. 5a illustrates the bracket 20 according to a preferred embodiment.

The bracket 20 comprises a plurality of ribs 21 which serve to grip and hold the cable 100. For this purpose, each rib 21 at least partially has a concave shape which forms a seat or receptacle for the cable 100. The opposing portion of the clamp gear 30 preferably also comprises a plurality of ribs 32 which serve to securely grip and hold the cable 100.

The present rib-like structure is one out of several configurations in order to achieve a sufficient friction between the cable 100 and the cable clamp 1. Alternatively, the bracket 20 and/or the clamp gear 30 may have differently shaped gripping surfaces, including for instance protrusions, recesses or a suitable coating. Alternatively, or additionally, the gripping surfaces may be made of a material which is suitable to securely hold the cable 100.

The bracket 20 comprises a gear shaft 22 which is shaped and configured to be insertable into the guiding openings 13a such that the bracket 20 can be moved along a trajectory defined by the guiding portions 13 of the clamp cover 10. This movement, in the present exemplary case along a linear trajectory, is best illustrated in FIG. 5c, indicated by arrows and two different positions of the bracket 20.

As indicated above, the guiding portions 13 are arranged such that the longitudinal direction of the guiding openings 13a is at least partially inclined relative to the axial direction of the correctly inserted cable 100, cf. to FIG. 4b. The purpose of this inclination is to adjust the vertical distance of the bracket 20 relative to the clamp gear 30. Thus, the cable clamp 1 can be easily adjusted for differently shaped and/or sized cables 100 as can be seen from a comparison of FIGS. 6a and 6b.

Figure 5B:
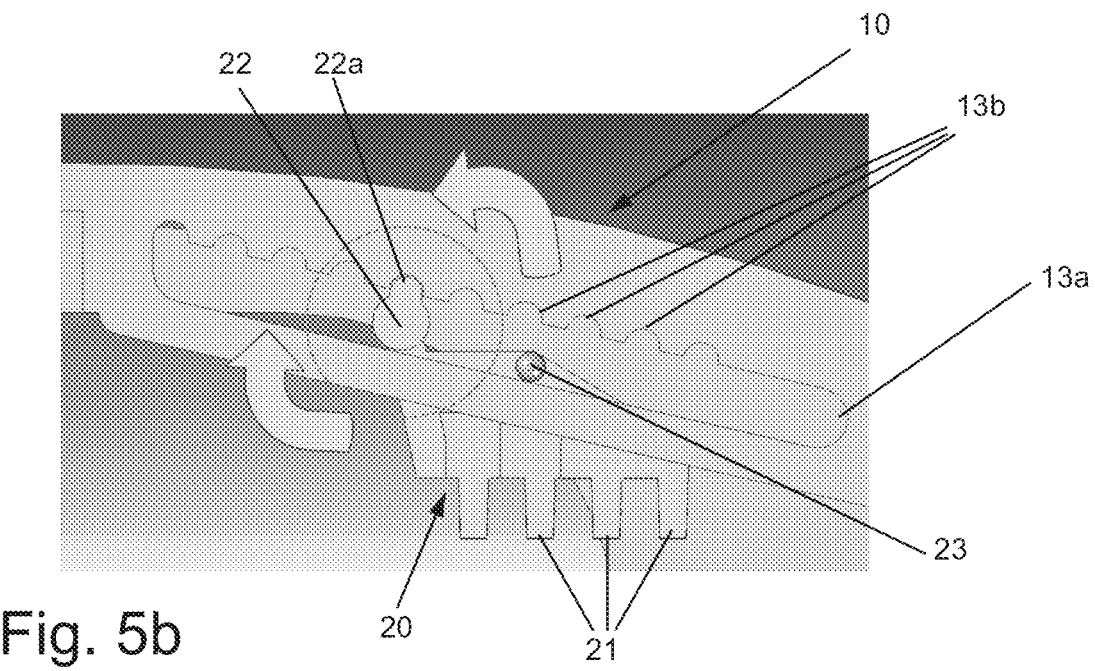
FIG. 5b is a perspective view of the bracket.
Figure 5C:
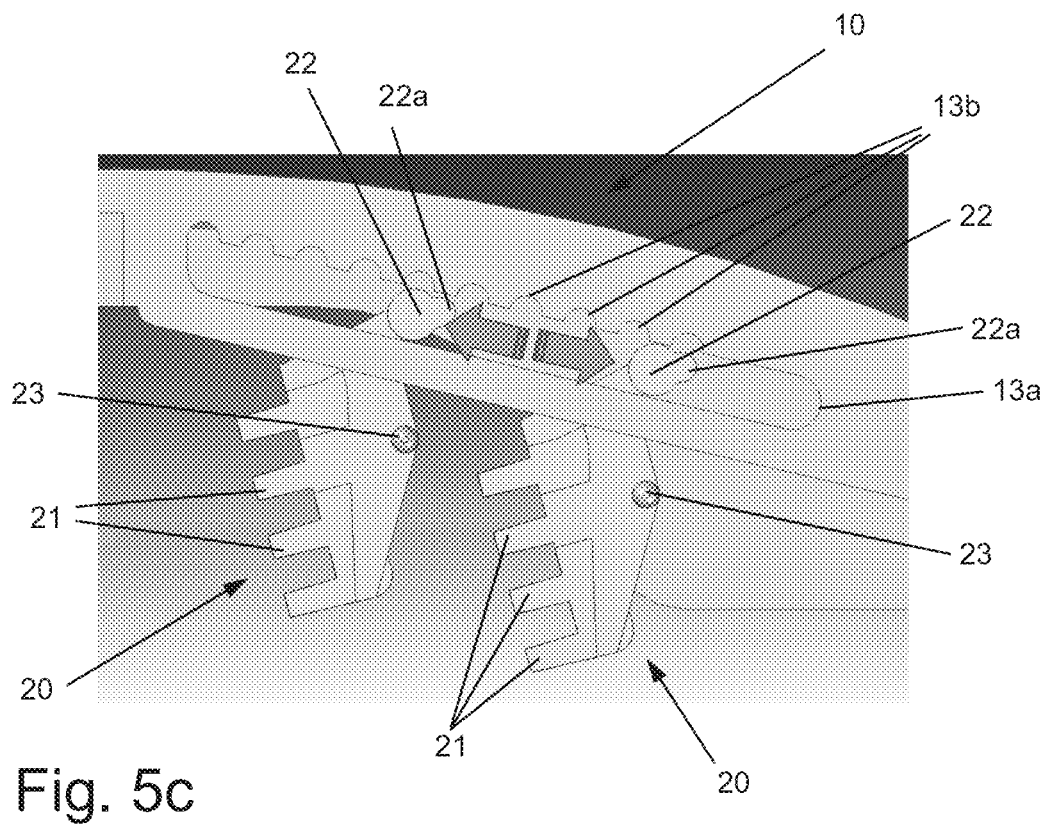
FIG. 5c is a perspective view of the bracket.
Figure 6A:
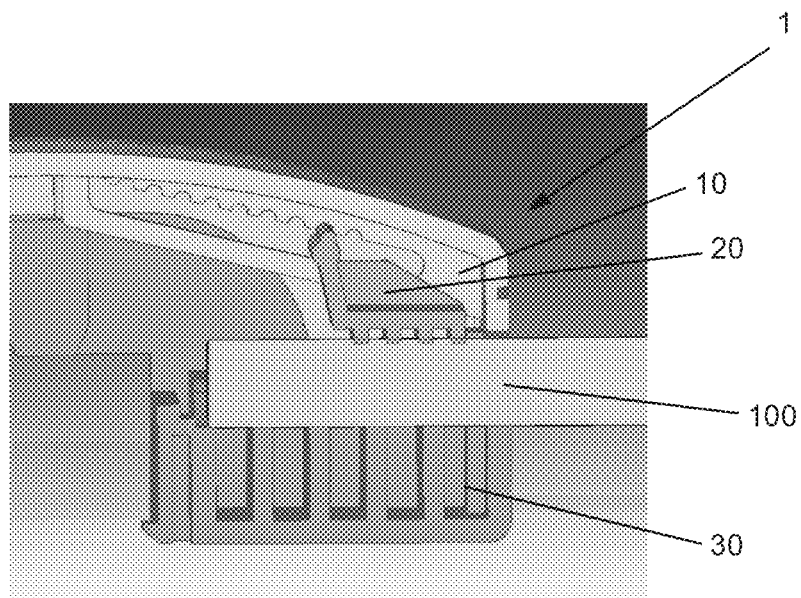
FIG. 6a is a perspective view of the cable clamp illustrating the holding capabilities.
Figure 6B:
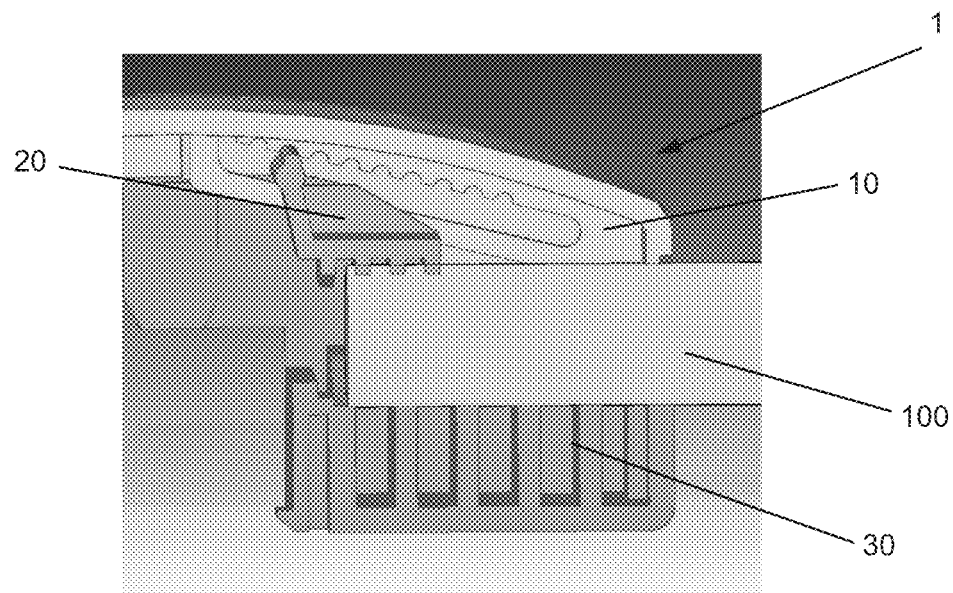
FIG. 6b illustrates how the cable clamp can be used to hold a variety of cable designs and diameters.

Once the position of the bracket 20 along the longitudinal direction of the guiding portions 13 has been adjusted, the position can be secured by rotating the bracket 20 around the gear shaft 22 as illustrated by arrows in FIG. 5b. For this purpose, the gear shaft 22 comprises a protrusion 22a which is shaped to fit into a corresponding pair of the stopping recesses 13b. Thus, rotating the bracket 20 such that the ribs 21 substantially take a horizontal position locks the bracket 20 at the desired longitudinal direction.

The locked position may be further secured by concave portions 23 which are configured to snap into the guiding openings 13a. The bracket 20 is unlocked by rotating the bracket 20 in a position as illustrated in FIG. 5c.

The bracket 20 may further comprise one or more lugs 24 configured to stabilize the bracket such as to avoid a deformation of the ribs 21 due to the pressing force towards the cable 100.

The cable clamp 1 as described above allows for a quick and easy installation of the cable 100 wherein the cable 100 is reliably fixed. The holding force can be adjusted by the bracket, thereby avoiding any degradation of the clamping force. The cable clamp 1 can be adjusted for different sizes and diameters of the cable 100. These effects are achieved with a simple and reliable configuration.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

Features shown in the embodiments, in particular in different embodiments, may be combined or substituted without leaving the scope of the invention.

What is claimed is:

1. A cable clamp for holding a cable, the cable clamp comprising:
    a clamp cover and a clamp gear removably attached to one another at a hinge and defining an inner space configured to contain a portion of the cable; and
    a bracket inside the inner space and configured to be clamped on the portion of the cable, wherein the bracket is adjustable in a direction perpendicular to an axial direction of the portion of the cable, and wherein the bracket is configured to take different positions in the inner space.

2. The cable clamp according to claim 1, wherein:
    the clamp cover is displaceable relative to the clamp gear about the hinge to access the inner space; and
    closing the clamp cover pushes the bracket towards the cable thereby applying a clamping force on the portion of the cable.

3. The cable clamp according to claim 1, wherein the clamp cover and the clamp gear are configured to be locked in a joined position via interfacing of:
    at least one clip opening; and
    at least one clip nose configured to snap into the at least one clip opening in the joined position.

4. The cable clamp according to claim 1, wherein the bracket comprises at least one lug configured to stabilize the bracket to avoid deformation thereof due to a clamping force towards the portion of the cable.

5. The cable clamp according to claim 1, wherein the hinge provides an axis of rotation for the clamp cover and the clamp gear relative to one another, wherein the axis of rotation extends substantially perpendicular to the axial direction of the portion of the cable.

6. The cable clamp according to claim 1, wherein the bracket is configured to be clamped on the portion of the cable so as to press the portion of the cable into contact with the clamp gear.

7. The cable clamp according to claim 1, wherein at least one of the bracket and the clamp gear is formed with a gripping surface comprising at least one of:
    a protrusion that grips and holds the portion of the cable;
    a recess that grips and holds the portion of the cable; and
    a coating layer that grips and holds the portion of the cable.

8. A lighting device driver module comprising the cable clamp according to claim 1.

9. A lighting device comprising the cable clamp according to claim 8.

10. A cable clamp for holding a cable, the cable clamp comprising:
    a clamp cover and a clamp gear removably attached to one another and defining an inner space configured to contain a portion of the cable; and
    a bracket inside the inner space and configured to be clamped on the portion of the cable, wherein the bracket is adjustable in a direction perpendicular to an axial direction of the portion of the cable, and wherein the bracket is configured to take different positions in the inner space;
    wherein:
        the clamp cover or the clamp gear comprises one or more guiding portions configured to guide the bracket along a defined trajectory;
        the bracket comprises a gear shaft; and the one or more guiding portions each comprise a longitudinal guiding opening configured to receive the gear shaft.

11. The cable clamp according to claim 10, wherein at least one of the guiding openings is at least partially inclined relative to the axial direction of the portion of the cable.

12. The cable clamp according to claim 10, wherein:
at least one of the guiding openings comprises two longitudinal sides; and
at least one of the two longitudinal sides comprises a plurality of stopping recesses defining discrete positions for at least one of positioning and locking the bracket.

13. The cable clamp according to claim 12, wherein the gear shaft comprises a protrusion shaped to fit into at least one of the plurality of stopping recesses.

14. The cable clamp according to claim 10, wherein the one or more guiding portions and the bracket are configured such that rotating the bracket around the gear shaft locks and unlocks the bracket at a longitudinal position within the at least one guiding opening.

15. The cable clamp according to claim 14, wherein the bracket further comprises at least one concave portion engaging the at least one guiding opening for securing a locked position of the bracket.

16. A lighting device driver module comprising the cable clamp according to claim 10.

17. A lighting device comprising the cable clamp according to claim 16.

18. A cable clamp for holding a cable, the cable clamp comprising:
a clamp cover and a clamp gear removably attached to one another and defining an inner space configured to contain a portion of the cable; and
a bracket inside the inner space and configured to be clamped on the portion of the cable, wherein the bracket is adjustable in a direction perpendicular to an axial direction of the portion of the cable, and wherein the bracket is configured to take different positions in the inner space;
wherein at least one of the bracket and the clamp gear comprises a plurality of ribs configured to grip and hold the portion of the cable, wherein the ribs at least partially have a concave shape which conforms to a cylindrical shape of the portion of the cable.

19. A lighting device driver module comprising the cable clamp according to claim 18.

20. A lighting device comprising the cable clamp according to claim 19.

* * * * *